United States Patent [19]
Shih

[11] Patent Number: 6,148,975
[45] Date of Patent: Nov. 21, 2000

[54] VEHICLE TRANSMISSION SYSTEM INCLUDING CLUTCH CONTROL TO ELIMINATE NEUTRAL IDLE GEAR RATTLE

[75] Inventor: Shan Shih, Troy, Mich.

[73] Assignee: ZF Meritor Automotive, Laurinburg, N.C.

[21] Appl. No.: 09/291,342

[22] Filed: Apr. 14, 1999

[51] Int. Cl.[7] .................................................. B60K 41/28
[52] U.S. Cl. ............................................ 192/3.62; 477/86
[58] Field of Search ................................ 192/3.62, 3.56, 192/3.59; 477/86, 87, 88, 89

[56] References Cited

U.S. PATENT DOCUMENTS

| | | | |
|---|---|---|---|
| 3,910,388 | 10/1975 | Moori et al. | 192/3.56 |
| 4,281,751 | 8/1981 | Suga et al. | 192/3.59 X |
| 4,621,721 | 11/1986 | Czerwick et al. | 477/86 |
| 4,674,611 | 6/1987 | Sakakiyama | 192/3.62 X |
| 4,981,202 | 1/1991 | Leigh-Monstevens et al. | |
| 5,096,031 | 3/1992 | Cortesi | 192/3.62 X |
| 5,176,234 | 1/1993 | Reik et al. | 192/53.2 |
| 5,307,269 | 4/1994 | Kohno | 477/86 X |
| 5,377,797 | 1/1995 | Mustapha et al. | 192/3.62 X |

Primary Examiner—Rodney H. Bonck
Attorney, Agent, or Firm—Howard & Howard

[57] ABSTRACT

A vehicle transmission system includes an automated clutch operator. An electronic controller determines when the transmission is in a neutral condition and controls the automated clutch operator to move the clutch into a non-engaged condition. The electronic controller also determines when the vehicle engine is operating at an idle speed and causes the automated clutch operator to move the clutch into a non-engaged condition only when the engine is idling and the transmission is in a neutral condition, which eliminates neutral idle gear rattle.

17 Claims, 1 Drawing Sheet

VEHICLE TRANSMISSION SYSTEM INCLUDING CLUTCH CONTROL TO ELIMINATE NEUTRAL IDLE GEAR RATTLE

BACKGROUND OF THE INVENTION

This invention generally relates to vehicle transmissions. More particularly, this invention relates to a transmission system having an automated clutch actuator that opens the clutch under selected conditions to eliminate gear rattle within the transmission.

A variety of vehicle transmissions are available currently in the market. Some transmissions are automated and do not require operator input other than selecting, for example, reverse or drive. Other transmissions are manual and require manual operation of a gear shift lever to manually move transmission components into selected gear ratios. Manual transmissions typically require manual actuation of a clutch pedal to eliminate the connection between an engine output shaft and an input shaft of the transmission. Manual clutch pedal actuation is typically required each time that a shift in gears is desired.

More recently, suppliers and vehicle manufactures have been attempting to simplify the operation of manual transmissions. Even with such improvements, those skilled in the art are always striving to make transmission systems better and more efficient. One problem that has not been addressed is commonly known as neutral gear rattle. This typically occurs when a vehicle, such as a heavy duty truck, is not moving so that the engine is at an idle speed. When the transmission is in neutral and the engine is at idle speed, there typically is enough rotation imparted to the transmission components so that a rattling of the gears occurs. This condition is undesirable because it generates noise and causes unnecessary contact between the various components of the vehicle transmission.

It is desirable to eliminate the neutral gear idle rattle problem. This invention addresses that need by providing an automated clutch actuator and a control strategy in order to automatically eliminate the possibility for the undesirable gear rattle.

Automated clutch actuators are known in the art, such as disclosed in U.S. Pat. No. 4,981,202. While automated clutch actuators are known, they have not been utilized in a manner that is effective to eliminate neutral gear idle rattle as is provided by this invention.

SUMMARY OF THE INVENTION

In general terms, this invention is a vehicle transmission system that includes a main gear box having an input shaft that is adapted to receive a driving force from an engine. An output shaft of the transmission is adapted to provide a driving force to at least one wheel on the vehicle. A plurality of gear members are selectively engaged to achieve a desired gear ratio between the transmission input shaft and the output shaft. A manually operable clutch selectively couples the main gear box input shaft to the engine when the clutch is placed into a closed or an engaged condition. An automated clutch operator selectively places the clutch into a non-engaged or open condition to uncouple the input shaft of the transmission from the engine. An electronic controller determines when the main gear box is in neutral and controls the automated clutch operator such that the clutch is automatically placed into the non-engaged condition when the main gear box is in neutral.

In the preferred embodiment, the electronic controller controls the automated clutch operator to move the clutch into the open or non-engaged condition when the main transmission gear box is in neutral and the vehicle engine is in an idle condition. An idle condition includes having a number of engine rotations per minute that is below a preselected threshold.

The various features and advantages of this invention will become apparent to those skilled in the art from the following detailed description of the currently preferred embodiments. The drawings that accompany the detailed description can be briefly described as follows.

DETAILED DESCRIPTON OF THE PREFERRED EMBODIMENTS

Figure 1:
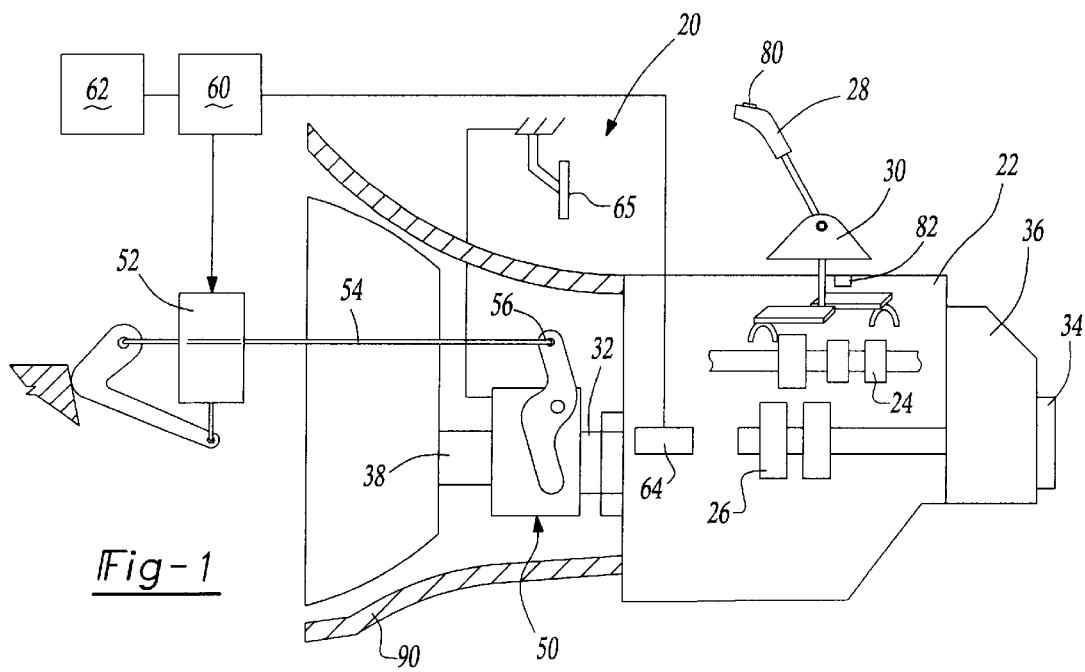
FIG. 1 is a diagrammatic illustration of a transmission system designed according to this invention.

FIG. 1 diagrammatically illustrates a transmission system 20 including a main gear box 22 that has a plurality of gear members 24 and 26. In the illustrated embodiment, a manually operable shift lever 28 is moveable about a pivot point 30 to manually, selectively engage different ones of the gear members 24 and 26 to achieve a desired gear ratio between a transmission input shaft 32 and a transmission output shaft 34.

Figure 3:
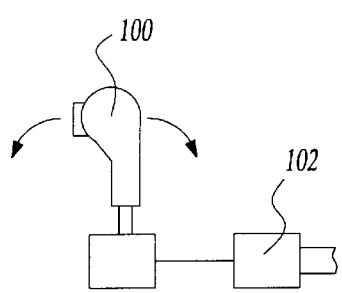
FIG. 3 is a diagrammatic illustration of an automated gear moving mechanism.

In the illustrated embodiment, the transmission system 20 includes a range gear box 36 as is known in the art. In some instances a range gear box may not be necessary. Additionally (as schematically illustrated in FIG. 3), this invention is applicable to transmissions having a shift lever 100 that generates electrical signals indicating a desired gear, the signals being communicated to an automated gear moving mechanism 102 that automatically moves the gear members into a position to achieve the desired gear ratio indicated by the generated electrical signal. A truly manual shift lever is illustrated but not required for implementing this invention.

The transmission input shaft 32 receives a driving force from an engine output shaft 38. The transmission output shaft 34 provides a driving force to at least one wheel axle on the vehicle in a conventional manner.

The transmission input shaft 32 is coupled to the engine output shaft 38 through a clutch 50. The clutch 50 can be a "dry clutch" or a "wet clutch" as is generally known in the art. The transmission system 20 includes an automated clutch operator 52 having a moving member 54 that operates a clutch engagement member 56, which moves the clutch plates into or out of engagement, for example.

The automated clutch operator 52 can be electrically powered (including a solenoid; for example) hydraulically powered or pneumatically powered depending on the needs of a particular situation. Automated clutch actuators are known in the art and those skilled in the art will be able to choose from among known components to realize an automated clutch operator 52 that operates as described in this specification.

An electronic controller 60 controls the operation of the automated clutch operator 52. The electronic controller 60 preferably communicates with an engine controller 62, to gather information regarding the operating condition of the vehicle engine. The electronic controller 60 and engine controller 62 can be any commercially available microprocessor programmed to function as needed to achieve the results of this invention. Engine controllers are well known in the art. Although the controllers 60 and 62 are schematically illustrated as separate devices, they both can be portions of a single microprocessor The electronic controller 60 preferably also communicates with a neutral sensor 64, that indicates a neutral condition within the main gear box 22. The neutral sensor 64 can be a conventional neutral switch or a combination of known sensors that monitor the positions of the various gear members 24 and 26 to indicate a neutral condition within the main gear box 22.

The electronic controller 60 gathers information from the neutral sensor 64 to determine when the transmission main gear box 22 is in a neutral condition. Whenever the transmission is in a neutral condition, the electronic controller 60 preferably causes the automated clutch operator 52 to place the clutch into a non-engaged or open condition. This automatically uncouples the transmission input shaft 32 from the engine output shaft 38 when the transmission is in a neutral condition.

Since the transmission system 20 preferably is a manually operated transmission (i.e., it requires manual movement of the shift lever 28 to achieve a change in the gear ratio), the clutch 50 typically will be already in the non-engaged condition during the move through neutral phase of a gear shift. This typically would be accomplished by manual operation of a clutch pedal 65 in a conventional manner. Therefore, the electronic controller 60 typically will not need to command the automated clutch operator 52 to open the clutch during a normal gear shift. This will be accomplished in a conventional manner.

Under certain conditions, however, the main transmission gear box 22 may be left in a neutral condition and the clutch 50 may still be in an engaged condition. Under these circumstances, the electronic controller 60 preferably causes the automated clutch operator 52 to move the clutch 50 into a non-engaged condition.

Most preferably, the electronic controller 60 monitors the neutral condition of the main transmission gear box 22 and the operating condition of the vehicle engine. The electronic controller 60 preferably communicates with the engine controller 62 to determine when the engine is in an idle condition. When the number of rotations per minute of the engine output shaft 38, for example, indicates that the engine is in idle, that information preferably is available from the engine controller 62. Alternatively, an idle condition can be determined by monitoring vehicle speed, manual throttle position or whether the parking brake is applied. Also, any combination of such information may be used.

The electronic controller 60 preferably takes such information from the engine controller 62 and information from the neutral sensor 64 to determine when to operate the automated clutch operator 52. Under conditions when the engine is in an idle condition and the transmission main gear box 22 is in a neutral condition, the electronic controller 60 causes the automated clutch operator 52 to move the clutch into a non-engaged condition. This automatically uncouples the transmission input shaft 32 from the engine output shaft 38 such that the idling speed of the engine does not cause any movement of the gear members within the transmission and eliminates the neutral idle gear rattle problem that otherwise occurs with conventional transmission systems.

Figure 2:
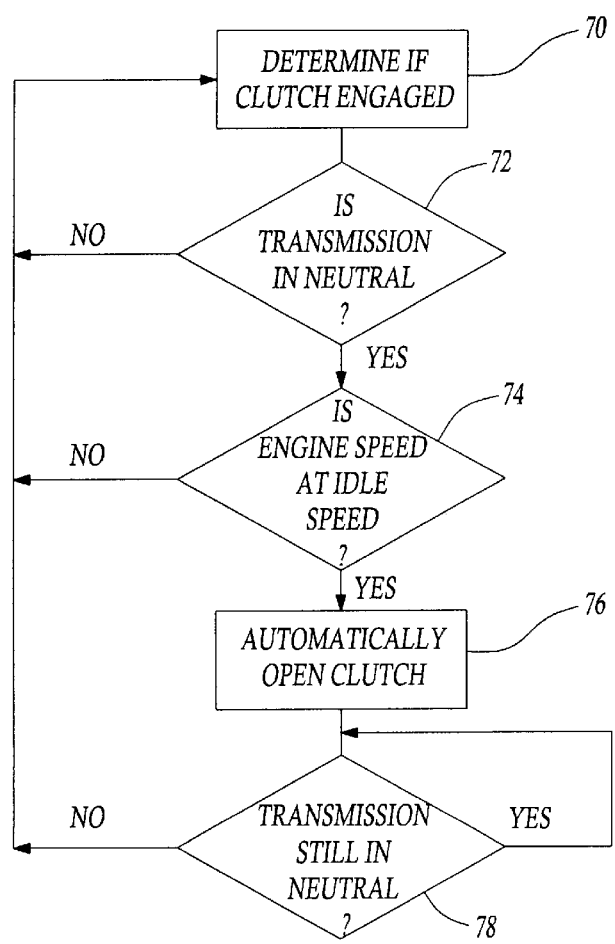
FIG. 2 is a flow chart diagram illustrating a method of this invention.

FIG. 2 illustrates, in flow chart form, a strategy for programming the electronic controller 60. At 70, the electronic controller 60 determines if the clutch 50 is closed or in the engaged condition. When the clutch is in the engaged condition, the electronic controller 60 determines at 72 whether the transmission is in neutral. This is accomplished, for example, by gathering information from the neutral sensor 64. If the transmission is in neutral, the electronic controller 60 determines at 74 if the engine speed is an idle speed. When that determination is positive, the electronic controller 60 causes an automated opening of the clutch at 76. Once the clutch has been disengaged, the electronic controller 60 continuously monitors whether the transmission is in neutral at 78.

Once the transmission is moved out of neutral, the clutch 50 preferably is reengaged automatically by controlling the clutch operator 52. Alternatively, an operator switch 80 can be provided within the vehicle cab portion to allow the vehicle operator to signal to the electronic controller 60 to cause the clutch 50 to be moved into the engaged position so that the vehicle can be driven as desired. The switch 80 can also be used under other conditions when it is necessary to manually override the clutch operator 52. In the illustrated embodiment, the operator switch 80 is conveniently mounted on the shift lever 28.

In another example where a manual clutch pedal is provided, manually releasing the clutch pedal will effectively override the automated clutch operator 52 so that the clutch 50 is engaged or closed as desired. A switch or sensor can be coupled with the clutch pedal to provide a signal to the controller 60 when to reengage the clutch or at least to cut power to the clutch operator 52 so that the movement of the clutch pedal results in the desired clutch operation. In the preferred embodiment, if the clutch operator 52 has opened the clutch 50 while the transmission is in neutral, the controller 60 will automatically surrender control of the clutch condition to the clutch pedal when manual pressure is applied to the clutch pedal.

When a vehicle includes a power take off gear, it is preferred to not automatically open the clutch 50 whenever the power take off gear is active or engaged. The controller 60 preferably is programmed to take the condition of the power take of gear when determining if the clutch 50 should be opened automatically. It is preferred to never automatically open the clutch 50 whenever the power take off gear is active. This can be monitored using a conventional sensor and providing an indication of the power take off gear status to the controller 60.

Another feature that can be incorporated with this invention is a sensor 82 that detects movement of the shift lever 28 in a position that is effective to engage the gears 24, 26. Whenever the clutch operator 52 has opened the clutch 50 and the electronic controller 60 receives a signal from the sensor 82 that the driver has engaged the gears, the clutch is automatically closed.

A further enhancement is to provide signals from the sensor 82 to the controller 60 indicating when the vehicle operator shifts the transmission out of gear. At that time, the controller can cause the clutch operator 52 to automatically open the clutch 50. This latter feature is especially useful when it is desirable to eliminate the need to utilize a manual clutch pedal during gear shifts.

Given this description, those skilled in the art will be able to choose from among commercially available microprocessors or other components to realize the electronic controller 60. Additionally, given this description, those skilled in the art will be able to appropriately program a microprocessor to operate as the electronic controller described in this specification.

In the preferred embodiment, the various components including the clutch 50, the main transmission gear box 22 and the automated clutch operator 52 are all maintained within a single housing 90. This invention provides the advantage of having a single housing 90 that houses the transmission components, the clutch and the automated clutch operator. By integrating all of these components within a single housing, economies of installing the transmission system 20 onto a vehicle are maximized.

The description just given is intended to provide an example implementation of this invention and is not intended to be limiting. Variations and modifications to the disclosed embodiment may become apparent to those skilled in the art that do not necessarily depart from the basis of this invention. The scope of legal protection given to this invention can only be determined by studying the following claims.

What is claimed is:

1. A vehicle transmission system comprising:
    a main gear box having an input shaft that is adapted to receive a driving force from an engine, an output shaft that is adapted to provide a driving force to at least one axle and a plurality of gear members that are selectively engaged to achieve a desired gear ratio between the input shaft and the output shaft;
    a clutch that selectively couples the main gear box input shaft to the engine when the clutch is placed into an engaged condition;
    an automated clutch operator that selectively places the clutch into a non-engaged condition to uncouple the input shaft from the engine; and
    a controller that determines when the main gear box is in a neutral condition and when the engine is in an idle condition and controls the automated clutch operator such that the clutch is automatically placed into the non-engaged condition only when the engine is in the idle condition and the main gear box is in the neutral condition.

2. The system of claim 1, wherein the automated clutch operator includes a hydraulically operated mover that moves the clutch into the non-engaged condition responsive to the controller.

3. The system of claim 1, wherein the automated clutch operator includes an electrically operated mover that moves the clutch into the non-engaged condition responsive to the controller.

4. The system of claim 3, wherein the electrically operated mover includes a solenoid.

5. The system of claim 1, including a neutral position sensor that generates a neutral signal when the main gear box is in the neutral condition and wherein the controller uses the neutral signal to determine when to cause the automated clutch operator to move the clutch into the non-engaged condition.

6. The system of claim 1, including gear member position sensors that generate gear position signals indicative of positions of the gear members within the main gear box and wherein the controller uses the gear position signals to determine when the main gear box is in the neutral condition.

7. The system of claim 1, including a manually operable shift lever that is moveable by a vehicle driver to manually move the gear members into a plurality of positions to achieve a desired gear ratio.

8. The system of claim 1, including a manually operable shift lever that is moveable to generate an electrical signal that is indicative of a desired gear ratio and including an automated gear moving mechanism that automatically moves the gear members into a position to achieve the desired gear ratio indicated by the generated electrical signal.

9. The system of claim 1, including a manually operated clutch pedal and wherein the clutch is manually controllable using the clutch pedal.

10. A method of controlling a vehicle transmission that includes an input shaft that is adapted to receive a driving force from an engine, an output shaft that is adapted to provide a driving force to at least one axle, a plurality of gear members that are selectively engaged to achieve a desired gear ratio between the input shaft and the output shaft, a manually operable clutch that selectively couples the main gear box input shaft to the engine when the clutch is placed into an engaged condition, comprising the steps of:

(A) determining when the transmission is in a neutral condition;
    (B) determining when the engine is in an idle condition;
    (C) determining when the clutch is in the engaged condition; and
    (D) automatically moving the clutch into a non-engaged condition only when the engine is in the idle condition and the transmission is in the neutral condition.

11. The method of claim 10, wherein the transmission includes an automated clutch operator and a controller in communication with the clutch operator and wherein steps (A) and (B) are performed by the controller and step (C) is performed by the clutch operator responsive to the controller.

12. The method of claim 11, wherein the transmission includes a neutral position sensor that generates a neutral signal indicative of when the transmission is in the neutral condition and wherein step (A) is performed by the controller using the neutral signal.

13. The method of claim 11, wherein the transmission includes gear position sensors that generate gear signals indicative of positions of the gear members and wherein step (A) is performed by the controller using the gear signals.

14. The method of claim 10, wherein step (C) is performed using one of an electrically powered moving member or a hydraulically powered moving member.

15. A vehicle transmission system, comprising:
    a transmission input shaft;
    a transmission output shaft;
    a plurality of gears that are selectively moved to engage a desired gear ratio between the transmission input shaft and the transmission output shaft;
    a shift lever that is selectively moveable by a driver of the vehicle to select a desired gear ratio;
    a clutch that selectively couples an engine to the transmission input shaft;
    a neutral sensor that detects when the transmission is in neutral;
    a clutch actuator that automatically releases the clutch so that the engine is not coupled to the transmission input shaft only when the neutral sensor indicates that the transmission is in neutral and the engine is in an idle condition.

16. The system of claim 15, wherein the clutch actuator includes a moving portion that moves responsive to at least one of the group consisting of electrical power, pneumatic pressure or hydraulic fluid.

17. The system of claim 15, including an electronic controller that determines when the engine is in the idle condition, the electronic controller communicating with the neutral sensor and the clutch actuator and wherein the electronic controller determines when the transmission is in neutral and the clutch is in an engaged position and wherein the electronic controller provides a signal to the clutch actuator to release the clutch from the engaged position only when the transmission is in neutral and the engine is in the idle condition.

* * * * *